United States Patent [19]

Hoornstra

[11] Patent Number: 4,995,014
[45] Date of Patent: Feb. 19, 1991

[54] LOW FREQUENCY HYDROPHONE AND DEPTH SENSOR ASSEMBLY

[75] Inventor: Stanley J. Hoornstra, Jackson, Mich.

[73] Assignee: Sparton Corporation, Jackson, Mich.

[21] Appl. No.: 471,600

[22] Filed: Jan. 29, 1990

[51] Int. Cl.⁵ .............................................. H04R 17/00
[52] U.S. Cl. .................................. 367/153; 367/155; 367/160; 367/174; 367/163
[58] Field of Search ............... 367/141, 153, 157, 173, 367/174, 163, 167, 160, 155

[56] References Cited

U.S. PATENT DOCUMENTS

| | | | |
|---|---|---|---|
| 3,308,425 | 3/1967 | McLoad | 367/141 |
| 3,992,693 | 11/1976 | Martin et al. | 367/155 |
| 4,141,295 | 2/1979 | Cambell et al. | 102/10 |
| 4,315,324 | 2/1982 | Junod et al. | 367/3 |
| 4,353,121 | 10/1982 | Ray et al. | 367/21 |
| 4,547,869 | 10/1985 | Savit | 367/149 |
| 4,648,082 | 3/1987 | Savit | 367/149 |
| 4,749,254 | 6/1988 | Seaver | 350/96.29 |
| 4,807,199 | 2/1989 | Yamamoto et al. | 367/15 |

Primary Examiner—Charles T. Jordan
Assistant Examiner—J. Woodrow Eldred
Attorney, Agent, or Firm—Reising, Ethington, Barnard, Perry & Milton

[57] ABSTRACT

The housing of a transducer supports both dynamic and static pressure sensors to obtain depth information as well as pressure wave signals. A semiconductive diaphragm with diffused resistances connected in a bridge is used as the static sensor which is centrally located on an end face of the housing. Several parallel-connected dynamic sensor elements are arrayed around the static sensor. Each dynamic sensor element is an edge supported brass disk with a thin piezoelectric ceramic disk soldered to it such that the disks flex in response to low frequency pressure waves to generate corresponding electrical signals. A low noise amplifier and filter is capacitively coupled to the dynamic sensor array to process hydrophone signals at a frequency below 1 Hz.

6 Claims, 1 Drawing Sheet

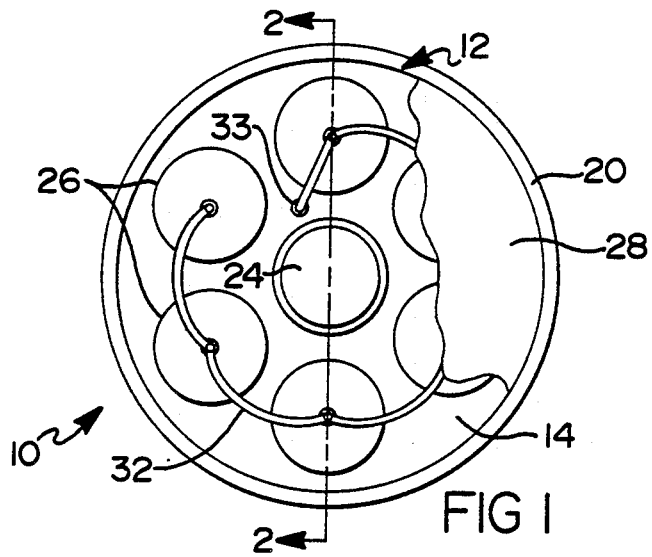
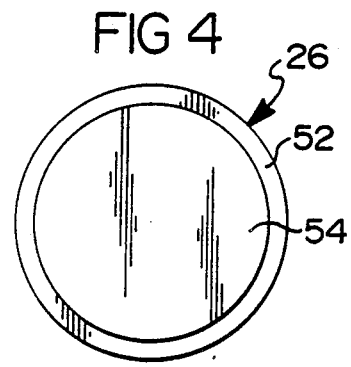
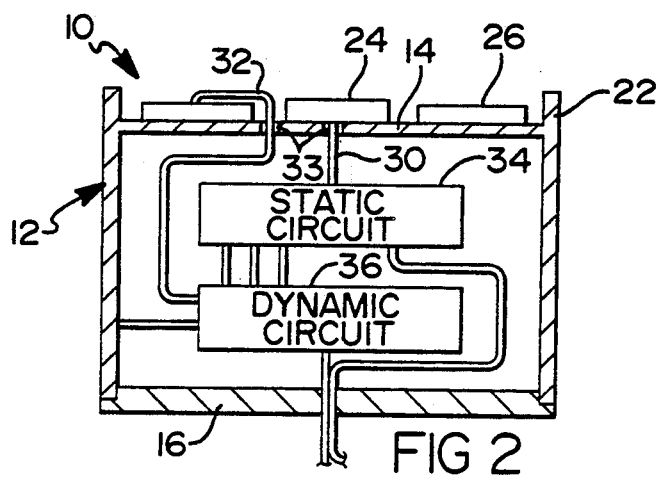
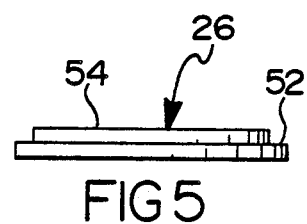
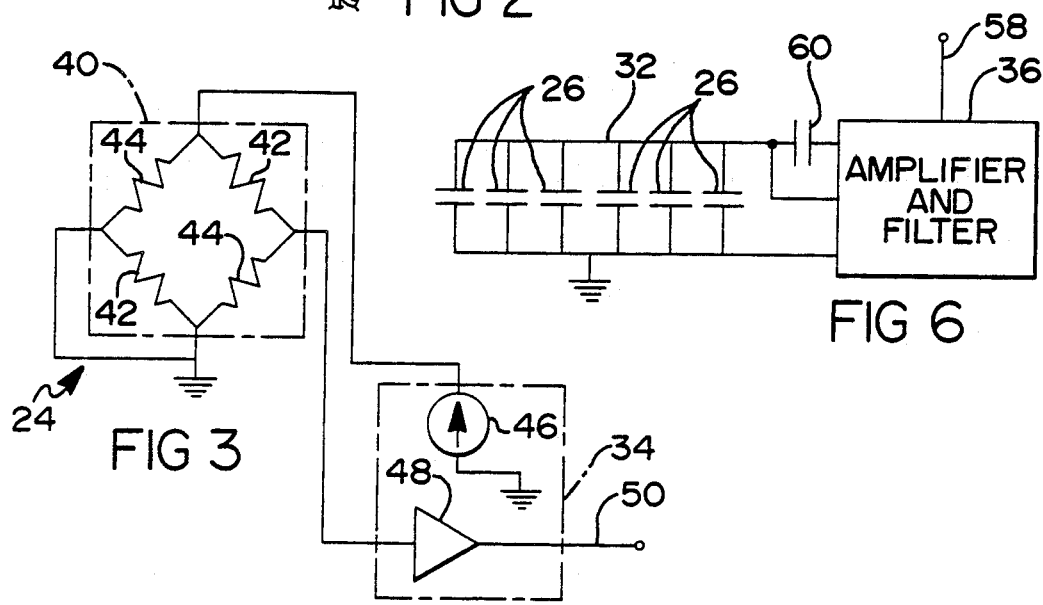

LOW FREQUENCY HYDROPHONE AND DEPTH SENSOR ASSEMBLY

FIELD OF THE INVENTION

This invention relates to hydrophone sensors and particularly to a hydrophone sensor assembly with a low frequency dynamic pressure sensor combined with a static sensor.

BACKGROUND OF THE INVENTION

Hydrophones have been used for many years for detection and location of ships and submarines and other underwater targets. Hydrophones are also used for sensing sonic waves in underwater geophysical exploration. A hydrophone receives sonic waves from underwater sources such as noise generated by a submarine or sonic waves reflected from an object. A single hydrophone may be used for "listening" for the presence of a surface object or an underwater object or for sensing small pressure waves.

The hydrophone is a dynamic sensor or transducer which converts the pressure waves in the water to electrical signals. An associated circuit with filtering and amplification functions conditions the signal for transmission via a cable to an electronics unit where the information is evaluated for data collection or for tactical purposes. Low frequency dynamic sensors are needed for high resolution pressure change measurement at frequencies much less than 1 Hz.

A useful bit of information for the evaluation of hydrophone signals is the depth of the hydrophone. A variable reluctance type dynamic transducer and the associated circuit has been proposed to provide a measure of static pressure which correlates to depth as well as dynamic pressure changes, but this requires a compromise in design so that neither the static pressure or dynamic pressure measuring functions are optimized.

It is already known to incorporate more than one sensor element and specifically more than one type of sensor in an underwater instrument. The Seaver U.S. Pat. No. 4,749,254 discloses an oceanographic instrument having an optical sensor system for measuring temperature, pressure and the index of refraction. The Savit U.S. Pat. No. 4,648,082 discloses an optical pressure gradient sensor for sensing the direction and magnitude of an acoustic wave propagating through a fluid. The Junod et al U.S. Pat. No. 4,315,324 discloses a hydrophone having two independent oscillators for a pressure sensor. However, the prior art does not appear to disclose separate sensors for measuring pressure wave events and depth. Generally the prior art transducers are operative at acoustic frequencies above 1 Hz and do not provide a means for measuring pressure waves which have a frequency below 1 Hz.

SUMMARY OF THE INVENTION

It is therefore an object of the invention to provide a transducer for a hydrophone with the capability of accurately measuring low frequency pressure waves and separately measuring static pressure.

It is also an object of the invention to provide a transducer for use underwater with the capability of optimally sensing dynamic pressure waves at frequencies below 1 Hz as well as depth via static pressure.

The invention is carried out by providing within a single housing a transducer with a dynamic sensor optimized for operation at frequencies less than 1 Hz for pressure wave information and a static sensor for depth information.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a partly broken away end view of a transducer according to the invention;

FIG. 2 is a cross sectional view of the transducer taken along line 2—2 of FIG. 1 with protective coating omitted;

FIG. 3 is a circuit diagram of the static pressure sensor and associated circuitry;

FIGS. 4 and 5 are front and cross section views respectively of a dynamic sensor element of FIG. 1; and FIG. 6 is a circuit diagram of a dynamic sensor array of FIG. 1 and its associated output circuitry.

DESCRIPTION OF THE INVENTION

Referring to FIGS. 1 and 2, a transducer 10 has a generally cylindrical metal housing 12 having an integral end face 14 and a separate closure member 16 forming another end face to seal the housing. The cylindrical wall 20 extends forward slightly beyond the end face 14 to form a protective skirt 22. Static and dynamic pressure sensors 24 and 26, respectively, are seated on the outer surface of the end face 14 for exposure to ambient pressures but are protected from direct contact with water by a layer 28 of polyurethane potting material which extends across the end face to fill the well defined by the skirt 22. Wire leads 30, 32 from the sensors extend through apertures 33 to the interior of the housing 12. Electronic circuitry 34, 36 within the housing is connected to the sensors 24, 26 respectively for supplying power to the static sensor and for processing signals from both of the sensors.

The sensor 24 located in the center of the end face 14 is a static sensor for measuring the pressure due to the depth of the transducer in the water, thereby providing depth information. The sensor 24 includes an edge supported silicon diaphragm 40 subject to flexure due to differential pressure across the diaphragm. Four semiconductor diffused resistors 42, 44 are judiciously located on the diagram such that two resistors 42 increase in resistance and the other two resistors 44 decrease in resistance as pressure increases. As shown in FIG. 3, the resistors are connected in a Wheatstone bridge configuration with like resistors in opposite arms of the bridge, thereby amplifying the effect of pressure on the resistors. The diaphragm 40 is enclosed in a cylindrical housing 41 filled with oil and having an outer membrane for transmitting static pressure to the diaphragm 40 via the oil. The static sensor 24 is a commercially available device such as the model 83 sensor manufactured by IC Sensors. The static circuit 34 associated with the static sensor 24 comprises a current source 46 for energizing the bridge with an input current and an amplifier 48 coupled to the bridge output to process the static pressure output signal and produce an output on line 50. The power consumption of this sensor and the associated circuit 34 is relatively small, on the order of 260 microamps of current, and once a depth reading is made the sensor may be turned off for further economy.

The sensors elements 26, located in a circular array surrounding the static sensor 24, are dynamic pressure sensor elements for measuring the pressure waves and comprise the hydrophone transducer. Each dynamic sensor element 26, as shown in FIGS. 4 and 5, comprises a ½ inch diameter brass diaphragm 52 supported by its edge and grounded to the housing 12, and a piezoelectric ceramic disk 54 soldered at one side to the diaphragm 52. Typically, the brass diaphragm is 0.051 inch thick and the ceramic disk 54 is 0.01 inch thick. A lead 32 is soldered to the other side of the ceramic disk. Upon bending of the diaphragm the piezoelectric material produces a charge which appears as a voltage across the ceramic disk. Sensors of this general type are commonly used in hydrophones.

A single sensor element 26 is operable at frequencies greater than 1 Hz. As frequency decreases, the impedance increases so that a signal cannot be acquired by the associated amplifier circuit without an unacceptable signal to noise ratio. Combining several sensor elements 26 in parallel dramatically improves the performance for low frequency applications. Each sensor has a capacitance of about 6600 pF while six sensors in parallel have a total capacitance of 40000 pF, thereby providing a much lower impedance as well as a dissipation factor of 0.015. This arrangement, coupled With a low noise signal processing circuit 36 with an input capacitor 60 to load the sensors, allows operation at frequencies of 0.5 Hz down to 0.0025 Hz with a pressure change resolution of 0.05 inch water pressure. Power consumption of the array is low; since the piezoelectric element generates a signal, no power input to the sensors is required. By using low power circuitry, operation of the dynamic sensor array requires only 40 microamps of current when the static sensor is turned off. A further advantage of using several sensor elements 26 is to average the acoustic parameters of the elements for better uniformity between different assemblies. The dynamic sensors 26 are capable of operating at static pressures of 0 to more than 900 pounds per square inch and have a dynamic range of 0.025 to 20 inches of water pressure.

Thus, as shown in FIG. 6, each sensor element 26 is depicted as a capacitor and the several sensor elements 26 are connected in parallel between line 32 and ground to provide a low impedance and are coupled by a capacitor 60 as well as by the line 32 to the associated circuit 36 which provides amplifying and filtering functions to produce an output signal on line 58. When the dynamic sensor elements 26 flex in response to pressure waves, voltages corresponding to the deflection are produced in the sensor and amplified in the circuit 36.

It will thus be seen that an improved hydrophone results from the incorporation of a static pressure sensor to provide essential depth information and the use of several dynamic sensor elements connected in parallel and optimized for very low frequency operation. The benefits obtained by the inclusion of both static and dynamic pressure transducers in a single housing are realized because each can be designed for its optimum operation and both depth and pressure wave information can be accurately provided.

The embodiments of the invention in which an exclusive property or privilege is claimed are defined as follows:

1. A combined hydrophone and depth sensor comprising:
    a sealed housing,
    a plurality of sensor means on the housing exposed to static and dynamic pressure inputs,
    the sensor means including static sensor means for responding to the static pressure due to the depth of the assembly and dynamic sensor means for responding to dynamic pressure due to pressure waves at a frequency below 1 Hz., and
    electronic means within the housing electrically coupled to the sensor means through the housing for receiving signals from the sensor means and for outputting signals containing depth information and low frequency pressure wave information.

2. The invention as defined in claim 1 wherein the housing has an outer face,
    the static sensor means comprises a single sensor mounted on the housing face, and
    the dynamic sensor means comprises an array of sensor elements mounted on the housing face.

3. A combined hydrophone and depth sensor comprising:
    a sealed housing,
    a plurality of sensor means on the housing exposed to static and dynamic pressure inputs,
    the sensor means including static sensor means for responding to the static pressure due to the depth of the assembly and dynamic sensor means for responding to dynamic pressure due to pressure waves at a frequency below 1 Hz., and
    electronic means within the housing electrically coupled to the sensor means through the housing for receiving signals from the sensor means and for outputting signals containing depth information and low frequency pressure wave information,
    wherein the static sensor means comprises a semiconductor diaphragm with diffused resistive elements which vary in resistance according to static pressure, and means for connecting the resistive elements in a bridge configuration.

4. A combined hydrophone and depth sensor comprising:
    a sealed housing,
    a plurality sensor means on the housing exposed to static and dynamic pressure inputs,
    the sensor means including static sensor means for responding to the static pressure due to the depth of the assembly and dynamic sensor means for responding to dynamic pressure due to pressure waves at a frequency below 1 Hz., and
    electronic means within the housing electrically coupled to the sensor means through the housing for receiving signals from the sensor means and for outputting signals containing depth information and low frequency pressure wave information,
    wherein the dynamic sensor means comprises an array of sensor elements electrically connected in parallel, each element comprising a metal diaphragm which flexes in accord with pressure waves and a piezoelectric ceramic disk secured to the diaphragm for generating electric signals in response to the flexing of the diaphragm so that the generated electric signals represent the pressure waves.

5. The invention as defined in claim 4 wherein the electronic means includes a low noise amplifier and filter circuit capacitively coupled to the dynamic sensor.

6. A sensor assembly for hydrophone and depth detector comprising:
    a watertight cylindrical housing having an end face, a plurality of pressure sensors mounted outside the housing on the end face, each sensor being exposed to the ambient pressure outside the housing, the sensors including a static sensor responsive to pressure due to depth and a hydrophone sensor having an array of dynamic sensor elements responsive to pressure waves, the dynamic sensor elements surrounding the static sensor and being connected together electrically in parallel, and circuit means within the housing and coupled to the sensors for separately processing signals from each sensor.

* * * * *